(12) United States Patent
Ogasawara

(10) Patent No.: US 7,171,377 B2
(45) Date of Patent: Jan. 30, 2007

(54) WORKPLACE SHOPPING SYSTEM AND MERCHANDISE PICKING SYSTEM, AND SHOPPING METHOD AND PICKING METHOD THEREOF

(75) Inventor: Nobuo Ogasawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 09/793,604

(22) Filed: Feb. 27, 2001

(65) Prior Publication Data

US 2001/0018671 A1 Aug. 30, 2001

(30) Foreign Application Priority Data

Feb. 28, 2000 (JP) ............................. 2000-051711

(51) Int. Cl.
*G06G 1/14* (2006.01)
(52) U.S. Cl. ........................ 705/22; 705/26; 705/27; 414/14
(58) Field of Classification Search ................ 705/26, 705/27, 22; 414/14
See application file for complete search history.

(56) References Cited

U.S. PATENT DOCUMENTS 5,395,206 A * 3/1995 Cerny, Jr. .................. 414/807

FOREIGN PATENT DOCUMENTS

EP 0924676 A2 * 6/1999

OTHER PUBLICATIONS

"Webvan Delivers the Goods" (Emert, Carol. Jan. 24, 2000. San Francisco Chronicle).*
"Digital grocers Online Shopping services are Winning a Loyal Following" (Sidell, Louisa. Jun. 14, 1999. Boston Globe).*
"From Carts to Clicks" (Pearce, Michael. Autumn 1998. Ivey Business Quarterly).*
Japanese Office Action dated Apr. 25, 2006 with translation.
Japanese Patent Application Publication No. 06-141100.
Japanese Patent Application Publication No. 2000-20591.
Japanese Patent Application Publication No. 11-232326.
Japanese Patent Application Publication No. 11-316777.
Japanese Patent Application Publication No. 11-208829.
Japanese Patent Application Publication No. 06-223091.
Japanese Patent Application Publication No. 04-201465.
Japanese Patent Application Publication No. 11-227909.
Japanese Patent Application Publication No. 11-100107.
Japanese Patent Application Publication No. 10-221104 dated Aug. 21, 1998 Not in English.
Japanese Patent Application Publication No. 08-320978 dated Mar. 12, 1996 No Translation.

* cited by examiner

*Primary Examiner*—Mark Fadok
(74) *Attorney, Agent, or Firm*—Arent Fox PLLC

(57) ABSTRACT

It is an object of the present invention to provide a system to receive orders of merchandise such as merchandise sold in a supermarket from a large number of employees, for example, of a workplace, and to deliver the ordered merchandise in a bundle, thereby enhancing the employees' convenience and the efficiency of business.

The system is provided with an order reception unit receiving an order of merchandise that can include perishable foods, a shopping list creation unit receiving one or more shopping lists corresponding to the orders from clients, a merchandise packing instruction unit receiving one or more shopping lists, and instructing picking and packing of the ordered merchandise corresponding to one or more clients, to a packing worker, and a merchandise delivery unit delivering the packed merchandise to the delivery locations corresponding to one or more clients.

29 Claims, 17 Drawing Sheets

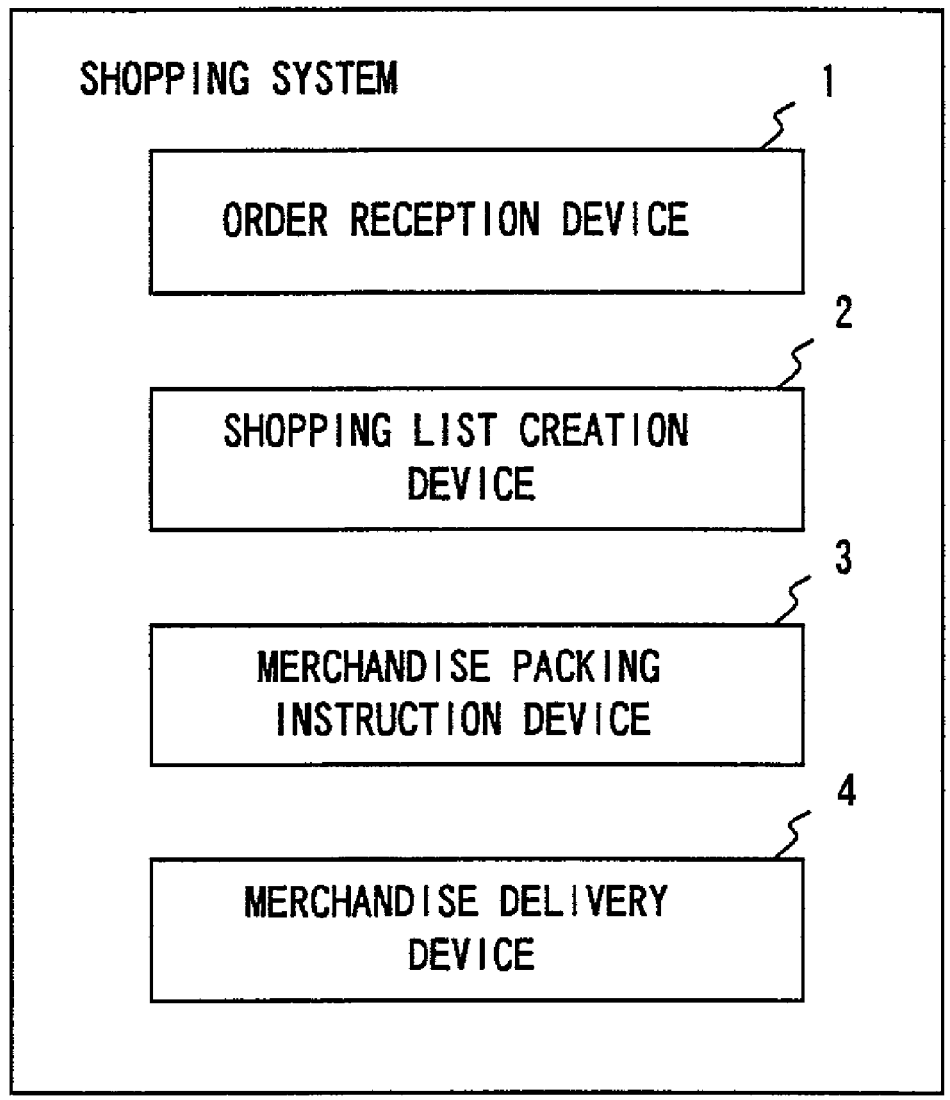
F I G. 1

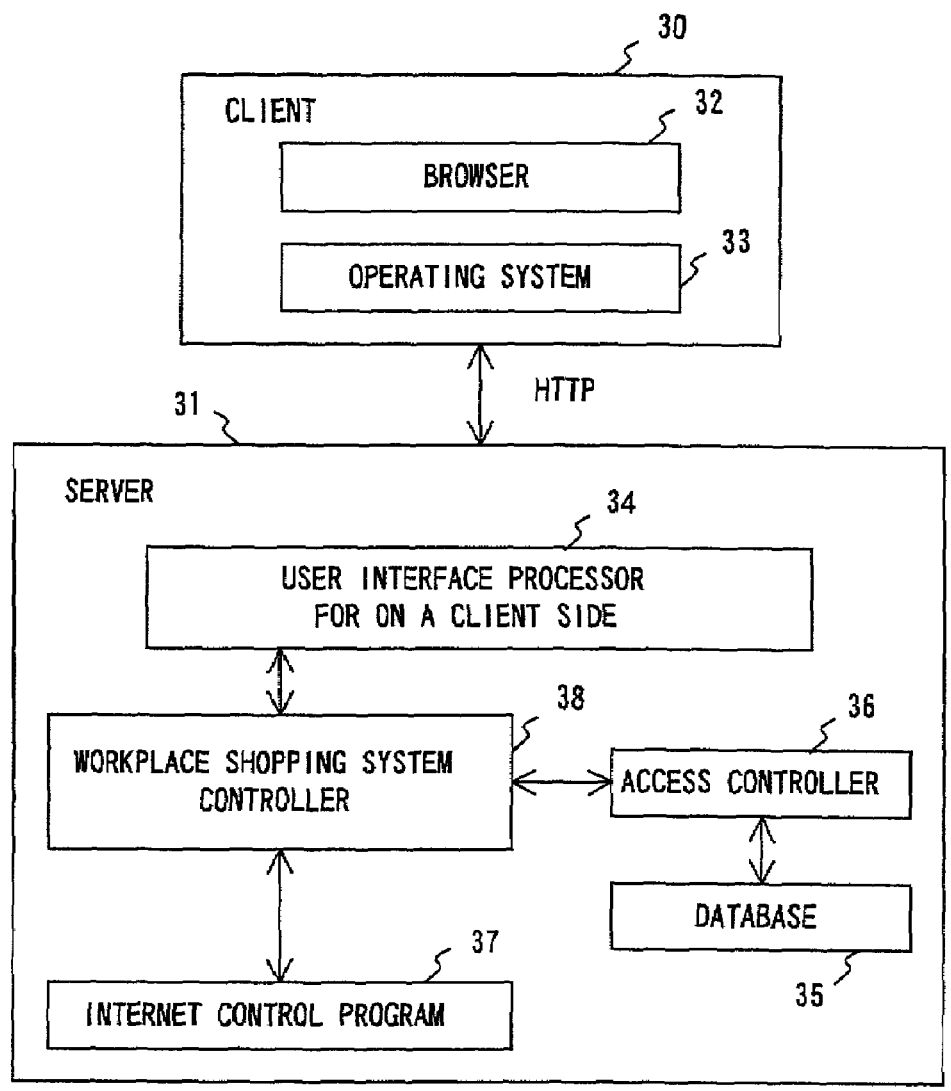
F I G. 4

| CLIENT'S NAME | PASSWORD | ENTERPRISE NAME | DELIVERY LOCATION | PAYMENT METHOD | TOTAL NUMBER OF POINTS | SUM OF PURCHASE AMOUNTS | CLIENT ATTRIBUTE INFORMATION |
|---|---|---|---|---|---|---|---|
| ICHIRO YAMADA | 123456 | THE ABC CORPORATION | SHINJUKU OFFICE | VISA 0987··· | 500 | 20,500 | ··· |
| HANAKO SATO | 224466 | I RO HA CONSTRUCTIONS | HARAJUKU OFFICE | HOUSE CARD 8765··· | 1,500 | 35,000 | ··· |
| | | | | | | | |
| | | | | | | | |
| | | | | | | | |
| | | | | | | | |

F I G. 9

| SKU NUMBER | MERCHANDISE NAME | PRICE | UNIT | DISCOUNT INFORMATION |
|---|---|---|---|---|
| 123001 | A BRAND MILK 500ml | 100 | PER ONE BOTTLE | 5% OFF |
| 123002 | A BRAND MILK 1000ml | 200 | PER ONE BOTTLE | 10% OFF |
| 123003 | A BRAND LOW FAT MILK 500mL | 150 | PER ONE BOTTLE | |
| 123004 | A BRAND LOW FAT MILK 1000mL | 300 | PER ONE BOTTLE | |
| 123005 | B BRAND MILK 500mL | 140 | PER ONE BOTTLE | 10 YEN OFF |
| 123006 | B BRAND MILK 1000mL | 250 | PER ONE BOTTLE | 30 YEN OFF |
| 123007 | C BRAND LOW FAT MILK 500mL | 160 | PER ONE BOTTLE | |
| 123008 | C BRAND LOW FAT MILK 1000mL | 300 | PER ONE BOTTLE | |
| 224001 | FUJI APPLE | 100 | PER ONE APPLE | IF YOU BUY FOUR APPLES, THE PRICE WILL BE EQUIVALENT TO THE PRICE OF THREE APPLES |
| 224002 | DELICIOUS APPLE | 120 | PER 100g | |

| SKU NUMBER | MERCHANDISE NAME | STOCK NUMBER | UNIT | SHELF NUMBER | REFRIGERATION INDICATION |
|---|---|---|---|---|---|
| 123001 | A BRAND MILK 500ml | 200 | PER ONE BOTTLE | SHELF NUMBER 19 | |
| 123002 | A BRAND MILK 1000ml | 200 | PER ONE BOTTLE | SHELF NUMBER 19 | |
| 123003 | A BRAND LOW FAT MILK 500mL | 100 | PER ONE BOTTLE | SHELF NUMBER 19 | |
| 123004 | A BRAND LOW FAT MILK 1000mL | 100 | PER ONE BOTTLE | SHELF NUMBER 19 | |
| 123005 | B BRAND MILK 500mL | 50 | PER ONE BOTTLE | SHELF NUMBER 19 | |
| 123006 | B BRAND MILK 1000mL | 50 | PER ONE BOTTLE | SHELF NUMBER 19 | |
| 123007 | C BRAND LOW FAT MILK 500mL | 50 | PER ONE BOTTLE | SHELF NUMBER 19 | |
| 123008 | C BRAND LOW FAT MILK 1000mL | 50 | PER ONE BOTTLE | SHELF NUMBER 19 | |
| 224001 | FUJI APPLE | 150 | PER ONE APPLE | SHELF NUMBER 30 | |
| 224002 | DELICIOUS APPLE | 200 | PER 100g | SHELF NUMBER 30 | |

| CLIENT'S NAME | ICHIRO YAMADA | | | | | | |
|---|---|---|---|---|---|---|---|
| ENTERPRISE NAME | THE ABC CORPORATION | | | | | | |
| DELIVERY LOCATION | SHINJUKU OFFICE | | | | | | |
| DELIVERY TIME AND DATE | 2/28 17:00 | | | | | | |
| PAYMENT METHOD | VISA 0987··· | | | | | | |
| ORDER MERCHANDISE | SKU NUMBER | MERCHANDISE NAME | QUANTITY | PRICE AFTER DISCOUNT | ALTERNATE MERCHANDISE | COMMENTS |
| 1 | 123001 | A BRAND MILK 500ml | ONE BOTTLE | 95 | NO ALTERNATE-SELECTION PROCESS | |
| 2 | 123004 | A BRAND LOW FAT MILK 500mL | TWO BOTTLES | 600 | B BRAND | |
| 3 | 224002 | DELICIOUS APPLE | 1000g | 1,200 | FUJI APPLE | RED APPLE |
| · | · | ······ | ······ | ······ | ······ | ······ |
| · | · | ······ | ······ | ······ | ······ | ······ |
| TOTAL | | | | | | |

FIG. 12

| SHELF NUMBER | SKU NUMBER | MERCHANDISE NAME | QUANTITY | BAG NUMBER | ALTERNATE MERCHANDISE | COMMENTS | REFRIGERATION INDICATION | FIANL MERCHANDISE |
|---|---|---|---|---|---|---|---|---|
| 19 | 123001 | A BRAND MILK 500ml | ONE BOTTLE | 1 (RED) | NO ALTERNATE-SELECTION | | | |
| 19 | 123004 | A BRAND LOW FAT MILK 1000mL | TWO BOTTLES | 1 (RED) | B BRAND | | | |
| 19 | 123005 | B BRAND MILK 500mL | ONE BOTTLE | 2 (BLUE) | NO ALTERNATE-SELECTION | | | |
| 19 | 123008 | C BRAND LOW FAT MILK 1000mL | TWO BOTTLES | 2 (BLUE) | B BRAND | | | |
| 25 | 334001 | D BRAND POTATO-CHIPS OF 200g | TWO BAGS | 3 (YELLOW) | NO ALTERNATE-SELECTION | | | |
| 25 | 334001 | D BRAND POTATO-CHIPS OF 200g | THREE BAGS | 4 (GREEN) | E BRAND | | | |
| 27 | 441001 | A BRAND SMOKED HAM OF 250g | TWO BAGS | 4 (GREEN) | NO ALTERNATE-SELECTION | BIG APPLE | | |
| 30 | 224001 | FUJI APPLE | 5 APPLES | 3 (YELLOW) | NO ALTERNATE-SELECTION | RED APPLE | | FINAL |
| 30 | 224002 | DELICIOUS APPLE | 1000g | 1 (RED) | FUJI APPLE | ...... | | |
| 41 | ...... | ...... | ...... | 4 (GREEN) | ...... | ...... | REFRIGERATION REQUIRED | FINAL |
| 41 | ...... | ...... | ...... | 4 (GREEN) | ...... | ...... | REFRIGERATION REQUIRED | FINAL |
| 45 | ...... | ...... | ...... | 2 (BLUE) | ...... | ...... | | FINAL |
| 45 | ...... | ...... | ...... | 3 (YELLOW) | ...... | ...... | | |
| ...... | ...... | ...... | | | | ...... | | |
| TOTAL | | | | | | | | |
| BAG NUMBER | CLIENT'S NAME | | | | | | | |
| 1 | ICHIRO YAMADA | ...... | | | | ...... | | |
| 2 | ...... | ...... | | | | ...... | | |
| 3 | ...... | ...... | | | | ...... | | |
| 4 | ...... | ...... | | | | | | |

F I G. 1 3

| NUMBER OF PIECES OF REMAINING MERCHANDISE | MESSAGE AREA | | | | |
|---|---|---|---|---|---|
| 15 | MERCHAN-DISE IS OUT OF STOCK | TERMINA-TION OF ALTER-NATION-PICKING | NO ALTER-NATION-PICKING | RETURN | WEIGHT INPUT |

SCAN INFORMATION AREA / SCROLL AREA

| SHELF NUMBER | SKU | MERCHANDISE NAME | QUANTITY | BAG NO. | |
|---|---|---|---|---|---|
| 19 | 123004 | A-BRAND LOW FAT MILK 1000ml | TWO BOTTLE | 1 | REFRIGE-RATION REQUIRED |
| ~~19~~ | ~~123001~~ | ~~A-BRAND MILK 500ml~~ | ~~ONE BOTTLE~~ | ~~1 (RED)~~ | |
| ~~19~~ | ~~123004~~ | ~~A-BRAND LOW FAT MILK 1000ml~~ | ~~TWO BOTTLE~~ | ~~1 (RED)~~ | |
| 19 | 123005 | B BRAND MILK 500ml | ONE BOTTLE | 2 (BLUE) | |
| 19 | 123008 | C BRAND LOW FAT MILK 1000ml | TWO BOTTLE | 2 (BLUE) | |
| 25 | 334001 | D BRAND POTATO-CHIPS OF 200g | TWO BAGS | 3 (YELLOW) | |
| 25 | 334001 | D BRAND POTATO-CHIPS OF 200g | THREE BAGS | 4 (GREEN) | |

F I G. 1 4

_US 7,171,377 B2_

WORKPLACE SHOPPING SYSTEM AND MERCHANDISE PICKING SYSTEM, AND SHOPPING METHOD AND PICKING METHOD THEREOF

BACKGROUND OF THE INVENTION

1. Field of the Invention

The present invention relates to a shopping system of merchandise through the Internet. More specifically, it relates to a workplace shopping system for ordering all types of merchandise, including perishable foods sold in a supermarket including frozen foods, from a workplace, and delivering the foods to the workplace.

2. Description of the Related Art

With the recent development of a network, various types of business using, for example, the Internet has been spread. One of them electronic commerce, which enables the transaction with a consumer or a partner to be economically and quickly performed online. Further, various types of merchandise purchasing, in other words, many types of shopping have been carried out through the Internet.

At present, however, a very convenient and effective shopping system for an employee and a retailer such that orders of merchandise are received from a large number of employees in workplace units or enterprise units, and the ordered merchandise is delivered in workplace units, enterprise units, or office units, has not been established yet. In conventional shopping through the conventional Internet, there is a problem that the kind of merchandise is comparatively limited, and it is especially problematic that perishable foods cannot be included.

SUMMARY OF THE INVENTION

Considering the above-mentioned problems, the object of the present invention is to provide a shopping system such that the orders of all the merchandise sold, for example, in a supermarket, and in other words the orders of merchandise including perishable foods, are received from a large number of employees in workplace units, and the merchandise is delivered to the workplace, which is very convenient and effective for employees and retailers.

In order to solve the above-mentioned problem, a shopping system in which a client orders merchandise and the merchandise is delivered to the client side is configured to comprise the following according to one embodiment of the present invention:

an order reception unit receiving an order of merchandise from a client;

a shopping list creation unit receiving one or more shopping lists corresponding to orders from one or more clients;

a merchandise packing instruction unit receiving one or more shopping lists from the shopping list creation unit, and giving instructions in picking and packing of the ordered merchandise, to pack the ordered merchandise corresponding to one or more clients; and a merchandise delivery unit delivering the packed merchandise to delivery locations corresponding to one or more clients.

On the basis of the orders received from the order reception unit, the shopping list creation unit creates a shopping list corresponding to the orders made by the clients. On the basis of the created shopping list, the merchandise packing instruction unit gives instructions in picking and packing of the ordered merchandise to pack the merchandise for a client. The merchandise delivery unit delivers the packed merchandise to delivery locations corresponding to the clients.

A plurality of clients belong to one or more groups, and the delivery location may be set as the address of one of the groups. Thus, a shopping system convenient for a client and effective for a retailer can be configured. As a group, the enterprise, a home, a community, or the like can be assumed.

In the above-mentioned configuration, the following operations can be achieved: the order reception unit presents a merchandise menu for displaying to a client the price for every piece of merchandise available on the day, adds and displays the image information of merchandise in accordance with the request from the merchandise menu from the client; the unit presents a list that updates the price of the merchandise in the past shopping list created corresponding to the client by the shopping list creation unit, to the price on the day; the unit presents the past order history list that was ordered by the client in the past and includes the price of the merchandise on the past order day; and the unit receives the data showing an address of the group to which a client belongs to, for example, an address of the office designated by a client from among a plurality of offices as a delivery location of the merchandise when the merchandise is ordered.

In the above-mentioned configuration, the merchandise packing indication unit sorts all the merchandise listed in one or more shopping lists, in an order to facilitate packing, creates a picking list, and indicates to a packing worker picking and packing of the merchandise in accordance with the picking list. In this case, the merchandise packing indication unit further comprises a display unit displaying the picking list.

The display unit displays each item in the picking list to a client who orders the merchandise of the item, using the background color corresponding to the client when a packing worker performs picking and packing of the merchandise simultaneously. The display unit flashes the refrigeration display corresponding to the item.

In the above-mentioned configuration, the merchandise packing instruction unit further comprises an out-of-stock information reception unit receiving out-of-stock information from a packing worker when the stock of the ordered merchandise runs out. In this case, the out-of-stock information reception unit is composed of a touch button for touching an area where the merchandise name of an item in the picking list is displayed on the display screen of the display unit, and an "out-of-stock" button of an area other than the area displaying the item in the picking list on the display screen.

When the packing process of merchandise for one client terminates during packing performed based on the picking list corresponding to a plurality of clients, the merchandise packing instruction unit sorts both merchandise listed in the shopping list for one or more clients other than the plurality of clients and merchandise that has not been picked yet in the picking list, creates a new picking list, and instructs the continuation of packing based on the new picking list to the packing worker.

The merchandise packing instruction unit further comprises a packing end notice unit notifying a packing worker of the end point of packing corresponding to the order of one client, and also a receipt printing unit printing a receipt displaying a client name and items of packed merchandise at the time of the end of packing.

The receipt printing unit further comprises a price check unit checking the price of merchandise at the time of the end of packing, and the receipt printing unit can print the checked price of the items of the packed merchandise.

In order to make a receipt bendable so that a client name is attached outside of the bag and the items of the merchandise are attached inside of the bag, the receipt printing unit can print a receipt in such a way that the client name is upside down to the items of the merchandise by 180 degrees. Further, the unit can print a number indicating which bag of a plurality of bags the bag is, on the client name side when there are a plurality of bags used for packing the merchandise for one client.

The merchandise picking system of the present invention further comprises a merchandise packing instruction unit externally receiving one or more shopping lists from one or more clients as an order list of merchandise that can include perishable foods, and issuing instructions in picking and packing of the ordered merchandise to a packing worker who packs merchandise for one or more clients, and a merchandise delivery unit delivering the packed merchandise to delivery locations corresponding to one or more clients.

According to another embodiment of the present invention, in a shopping method, an order of merchandise that can include perishable foods is received from a client, one or more shopping lists are created corresponding to the orders of one or more clients, thereby receiving the one or more shopping lists, instructions in a picking operation and a packing operation of the ordered merchandise are given to a packing worker who packs the merchandise for one or more clients, and the packed merchandise is delivered to the delivery locations corresponding to one or more clients.

According to still another embodiment of the present invention, in a merchandise picking method, one or more shopping lists are externally received as order lists of merchandise that can include perishable foods from one or more clients, instructions in a picking operation and a packing operation of the ordered merchandise are given to a packing worker who packs the merchandise for one or more clients, and the packed merchandise is delivered to delivery locations corresponding to one or more clients.

As a storage medium used in a computer for ordering merchandise on a client side, a computer readable storage medium storing programs for causing the computer to perform presenting a menu of merchandise that can include perishable foods to a client, and receiving an order of the merchandise from the client, is used.

As a storage medium used in a computer for creating a shopping list of merchandise to be ordered from a client, a computer readable storage medium storing programs for causing the computer to perform creating a menu of merchandise that can include perishable foods and transferring the menu to a computer on the client side, creating a shopping list using the merchandise order data sent from a computer on the client side, and transferring the created shopping list to the computer on a merchandise delivery side, is used.

As a storage medium used in a computer provided on the merchandise delivery side, for picking merchandise corresponding to the order from a client, and for delivering the merchandise to the client side, a computer readable storage medium for causing the computer to perform creating a picking list by sorting all the merchandise listed in one or more shopping list to be used as a list of ordered merchandise that can include perishable foods, in the order of facilitating a picking operation, and instructing a picking operation based on the created picking list to a packing worker, is used.

As mentioned above, a shopping system convenient and efficient for both clients and shops can be configured by receiving the orders of various merchandise including perishable foods from clients who are many employees of a workplace, for example, and by delivering the ordered merchandise in a bundle to the workplace.

BRIEF DESCRIPTION OF THE DRAWINGS

The features and advantages of the present invention will be more clearly appreciated from the following description taken in conjunction with the accompanying drawings in which like elements are denoted by like reference numerals in which:

FIG. 1 is a drawing showing the principle configuration of the present invention;

FIG. 4 is a drawing showing an outline of the configuration of a workplace shopping system;

FIG. 9 is a drawing showing examples of the data configuration and storage data of a client management database;

FIG. 10 is a drawing showing examples of the data configuration and storage data of a price database;

FIG. 11 is a drawing showing the data configuration of a stock database and a merchandise for each shelf database, and examples of storage data;

FIG. 12 is a drawing showing a completed shopping list;

FIG. 13 is a drawing showing an example of a picking list;

FIG. 14 is a drawing showing an example of the display screen of a picking terminal;

DESCRIPTION OF THE PREFERRED EMBODIMENTS

Figure 2:
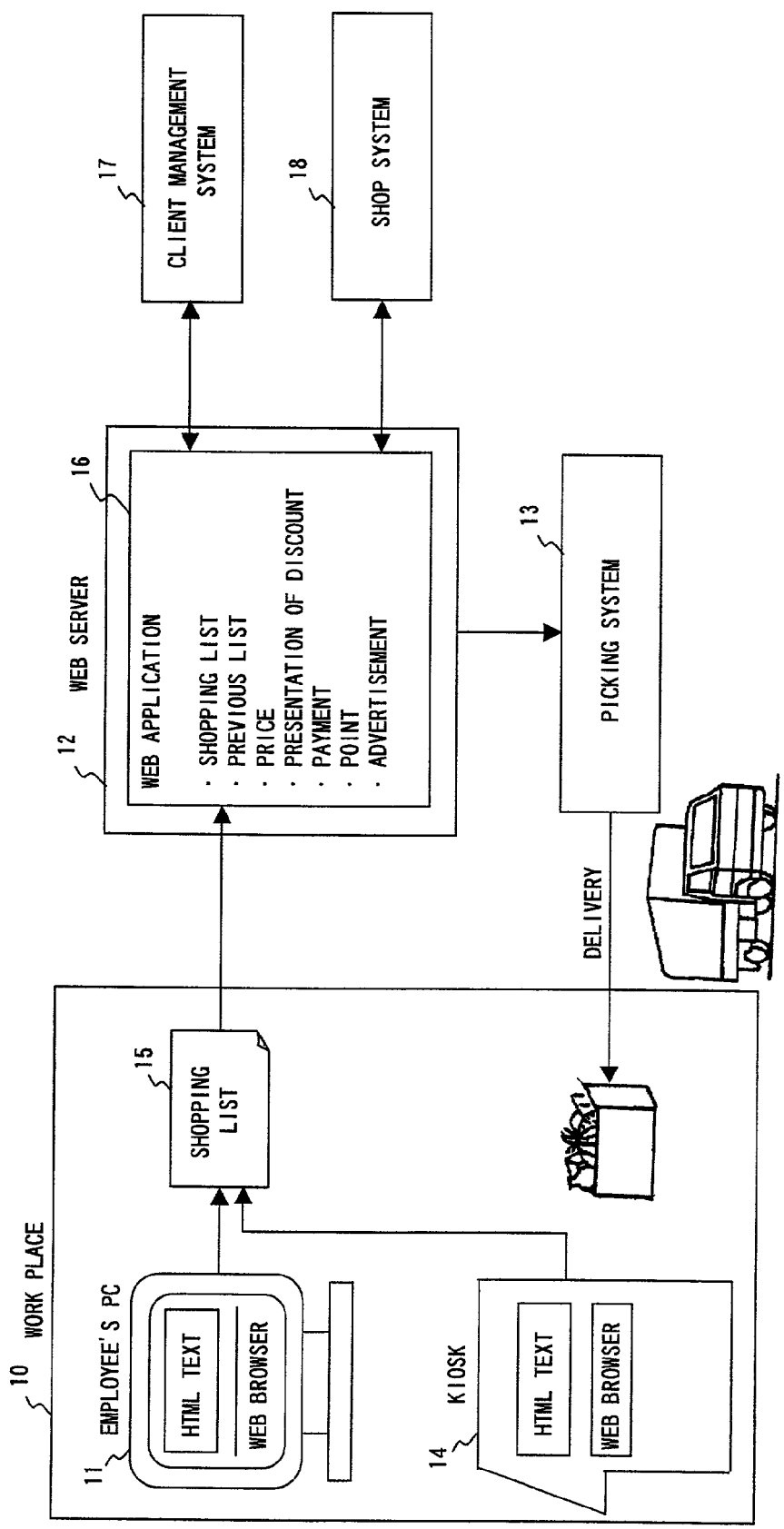
FIG. 2 is a diagram showing the entire configuration of a workplace shopping system related to the embodiments of the present invention.

FIG. 1 is a drawing showing the principle configuration of a shopping system of the present invention. The drawing shows the principle configuration of a shopping system where a client orders merchandise, and the merchandise is delivered to the client side.

In FIG. 1, an order reception device 1 is, for example, a personal computer on the client side, and it receives the order of merchandise, for example, merchandise including daily necessities of every kind including frozen foods or perishable foods, from a client. A shopping list creation device 2 is a web server that is installed on the Internet, for example, and creates one or more shopping lists corresponding to each of the orders from one or more clients.

A merchandise packing instruction device 3 is provided in a picking system for picking merchandise and delivering the merchandise to the order destination. The device 3 receives one or more shopping lists from the shopping list creation device 2, and instructs a picking operation and a packing operation of merchandise for one or more clients to a worker who packs the merchandise. A merchandise delivery device 4 delivers the packed merchandise to delivery locations corresponding to each of one or more clients.

As a shopping system related to the embodiments of the present invention, a system such as a workplace shopping system, a community shopping system, a home shopping system, or the like, is conceivable. In the workplace shopping system, a client belongs to one workplace. The order reception device 1 is provided with the workplace, and the delivery location is the address of the workplace. In the community shopping system, a client belongs to one party (community) such as a school, a hospital, a day-care center, or the like. The order reception device 1 is provided with the address of the party, and the delivery location is the address of the party. Furthermore, in the home shopping system, the order reception device 1 is provided with the client's home, and the delivery location is the client's home.

FIG. 2 is a diagram showing the entire configuration of a workplace shopping system related to the embodiments of the present invention. In the drawing, a main part of the system is installed in a workplace 10 and is composed of a personal computer (PC) 11 provided in the workplace 10 for receiving the order of merchandise from a client, a web server 12 provided on the Internet for creating a shopping list completed corresponding to the orders from a plurality of clients, and a picking system 13 for packing the merchandise for each client on the basis of the data given by the web server 12.

In the present invention, the merchandise to be ordered by a client includes all the merchandise that is sold in a general shop and that includes perishable foods, frozen foods, and daily necessities being generally sold in a supermarket or the like. The order is transferred to the web server 12 as a (uncompleted) shopping list 15 that is described in an HTML text format through a web browser of the personal computer 11 of the client of a workplace. Otherwise, the order is transferred similarly from the workplace 10 or nearby kiosk 14.

The designation method of the merchandise that an employee wishes to buy is fundamentally a menu form, but in addition to that, a unit suitably retrieving merchandise can be installed. The menu is created to have, for example, a plurality of hierarchies for each category of merchandise. In the last hierarchy, the name of the merchandise, price, discount information, or the like is displayed. For the displayed merchandise, a client designates the number of units of merchandise, and, for example, "put into basket" so as to create the (uncompleted) shopping list 15. The ordered merchandise is delivered on and at the previously designated time and place with the ordered merchandise from the other clients of the same workplace.

The shopping list 15 is transferred to the web server 12 through the Internet or an intranet. A web application 16 is provided on the web server 12, and is connected with a client management system 17 and a shop system 18. Thus, the web application 16 can access the database of the price of the merchandise sold at a shop, the stock database, the client management database for managing the points given depending on the purchase amount in the past for each client, or the like.

The web application 16 manages the current shopping list of a client, the previous shopping list of the client, the presentation of the price and the discount information of the merchandise, the payment method, the number of points for each client, the advertisement of the merchandise or the like. User registration for workplace shopping should be completed by a client in advance, and at that time, he or she designates the method of payment, for example, the number of a credit card or a house card. A system side, for example, the web server 12 performs an examination, such as credit checking of the payment method of the user after user registration. After user registration is allowed, the server 12 registers the client as a user. The settlement of accounts of the purchase amount is carried out by the examined payment thereafter. Shopping lists such as the data of orders from clients are transferred to the picking system 13 provided with a shop, a warehouse or a delivery center.

Figure 3:
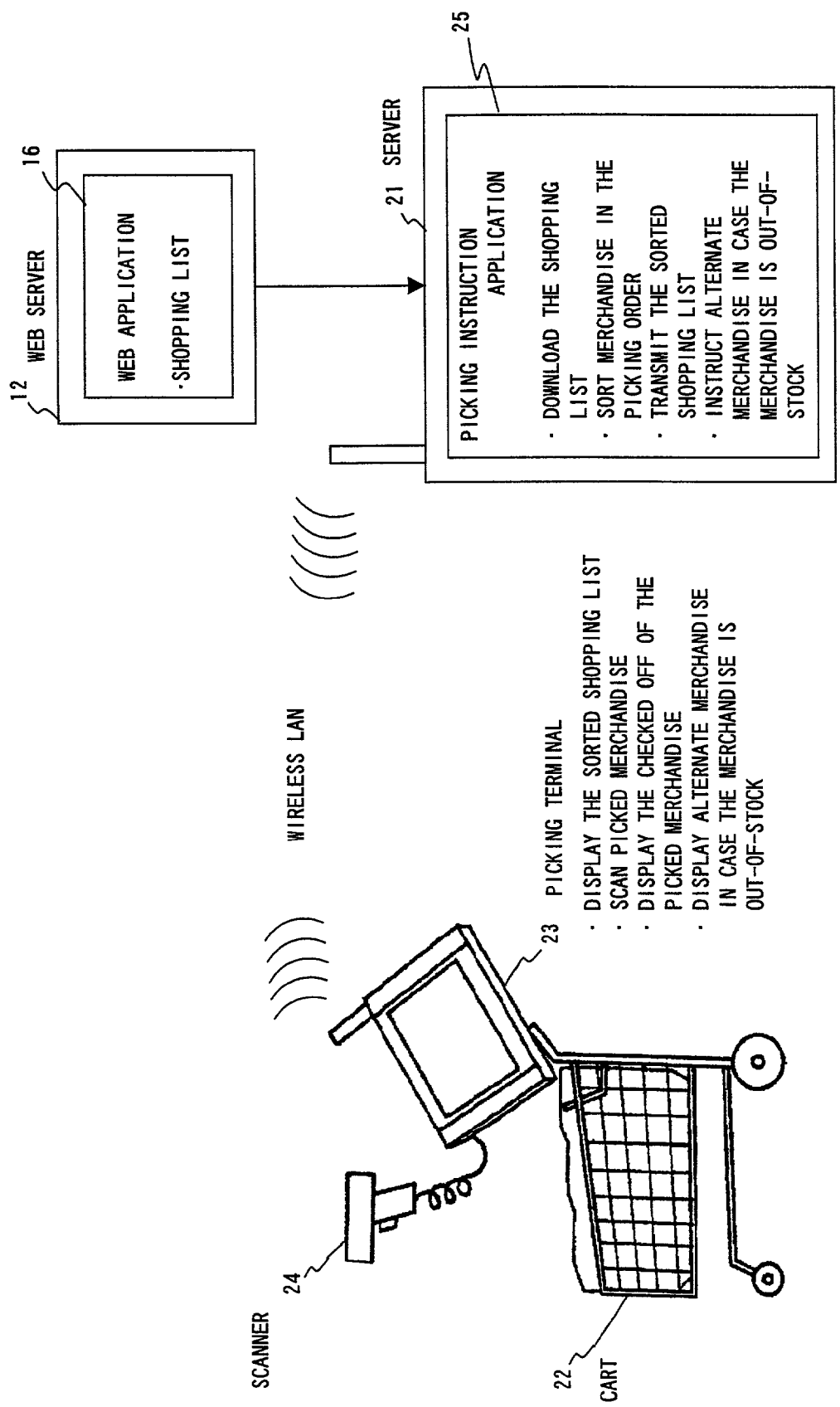
FIG. 3 is a drawing showing the configuration example of a merchandise picking system.

FIG. 3 is an explanatory drawing of the picking system 13 of FIG. 2. In the drawing, a picking system is composed of a server 21 for receiving data such as a (completed) shopping list from the web application 16 provided in the web server 12, a cart 22 for packing merchandise, for example, packing it in a bag, and a picking terminal 23 and a scanner 24 that are provided on the cart 22.

A picking instruction application 25 is provided with the server 21. By the application, the orders received from a plurality of clients are arranged to be suitable for the picking process for each client. At that time, the ordered merchandise is sorted in arrangement order of shelves where merchandise is displayed or stocked so that a picking worker effectively picks the ordered merchandise while searching for the ordered merchandise in the store, warehouse, and distribution center one time.

Specifically, the names of purchase merchandise of a plurality of clients are displayed in arrangement order of shelves. The number of pieces of merchandise, a shelf number attached to each shelf, and a number of a bag to be used for packing merchandise are arranged in a displayable form next to the name of the merchandise. The sorted shopping list (picking list) is sent to the picking terminal 23 on the side of the cart 22 through a wireless LAN. The picking list includes the instruction of alternate merchandise in the case merchandise is out-of-stock if necessary.

In this invention, the packing of ordered merchandise from a plurality of clients, specially, packing the merchandise in a bag or a box is carried out by the worker of a distribution merchant in a warehouse or a distribution center, or by the clerk in a supermarket. For example, a bag-packing operation is performed in such a way that bags for a plurality of clients are provided on the cart 22, and a clerk packs the ordered merchandise in bags simultaneously for three or four employees.

The cart 22 is provided with a terminal unit having, at least, a display function, specially, the picking terminal 23 and bar code scanner 24. A notebook-sized terminal with a color LCD without a cover having, for example, a radio function (terminal of a personal computer base), and a bar code scanner that is installed outside of a computer can be used. It is desirable to have a touch panel for the display unit. A unit having a function key can be used in place of the touch panel. Furthermore, a printer such as a receipt printer is connected with the picking terminal 23 as an option.

A sorted shopping list corresponding to the orders made from a plurality of clients is displayed on the picking terminal 23. For example, the clerk of a supermarket picks the merchandise in the displayed order, and scans the bar code of merchandise. By this scanning, an erasure line or a checking mark is attached to the name of the ordered merchandise that is displayed on the display unit, and an erasure process is carried out. When wrong merchandise is scanned, an error message is displayed. In the case the merchandise is out-of-stock, the alternate merchandise is displayed, so that it becomes possible to judge whether the alternate merchandise matches the information about the alternate merchandise sent by the clients.

FIG. 4 is an explanatory drawing of the structure outline of a workplace shopping system. The drawing shows a rough sketch of the system configuration of a client 30 corresponding to the employee's personal computer 11 of FIG. 2, and a server 31 corresponding to the web server 12, but the configuration corresponding to the picking system 13 is not shown.

The client 30 is equipped with a browser 32 equivalent to the web browser of FIG. 2, and an operation system 33. The client 30 sends/receives the data that is compiled with an HTTP protocol to/from the server 31.

The server 31 is equipped with a client side user interface processor 34 for performing an interface process with a client side, a database 35 for storing a merchandise name, price, discount information, or the like, an access controller 36 for controlling the accesses to the data stored in these databases, an Internet control program 37, and a workplace shopping system controller 38.

Figure 5:
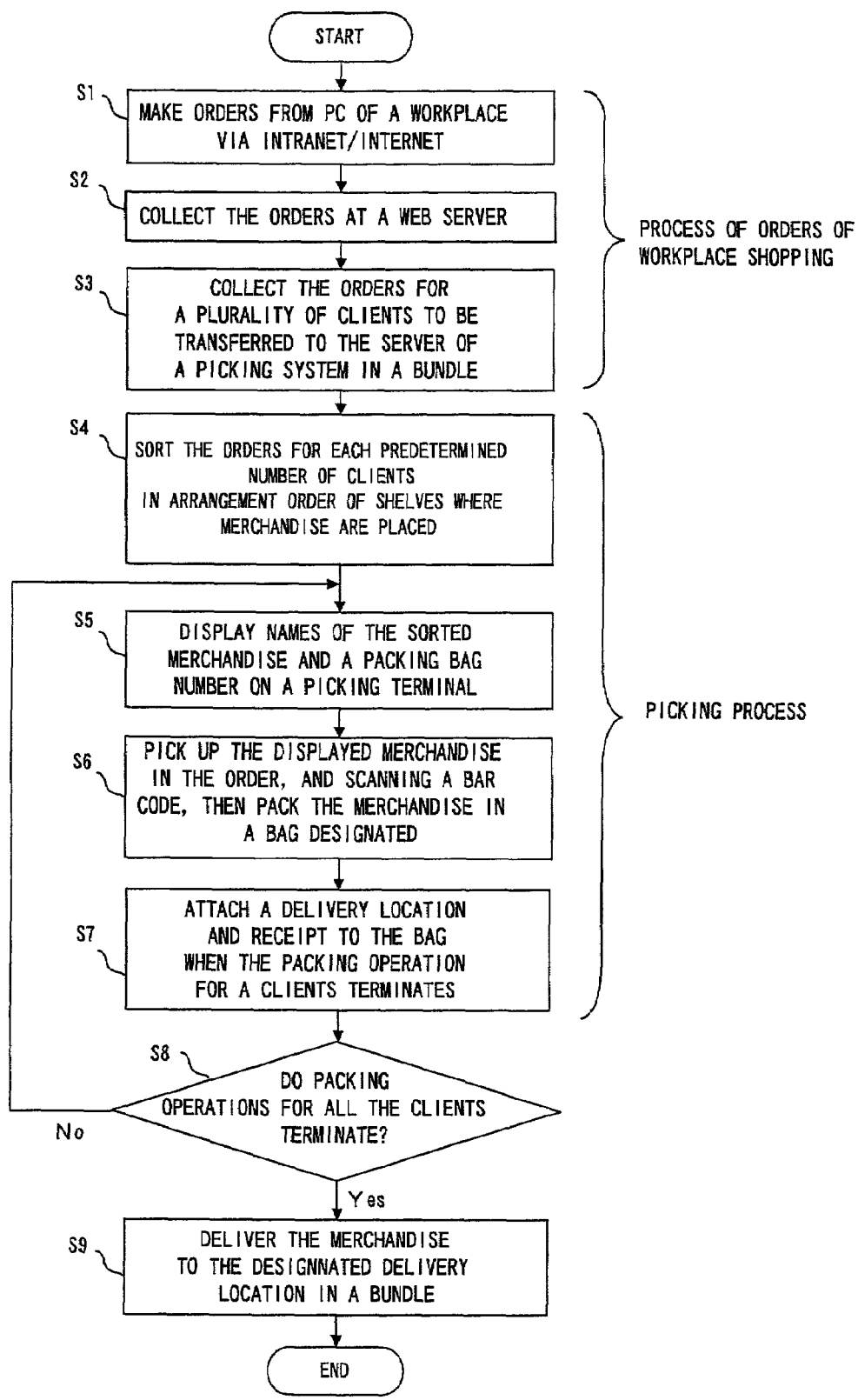
FIG. 5 shows an entire process flowchart of the workplace shopping system.

FIG. 5 shows the entire process flowchart in the workplace shopping system of the present invention. In the drawing, steps S1 to S3 show the outline of the workplace shopping order processes performed by the workplace 10 side, and also the web server 12 of FIG. 2. Steps S4 to S9 show the outline of the picking processes performed by the picking system 13.

When a process starts in FIG. 5, the order is received from, for example, the personal computer 11 of an employee of the workplace 10 through the Internet, or an intranet in step S1. In step S2, the received orders are gathered in the web server 12. In step S3, the orders of a plurality of clients are gathered to be transferred to the server 21 of the picking system 13.

In the picking process, the server 21 of the picking system 13 first sorts the ordered merchandise in arrangement order of shelves for the predetermined number of clients (the number is predetermined in step S4). In step S5, a shopping list displaying the name of the sorted merchandise, the number of bags for packing the merchandise, and the like are transferred to the picking terminal 23 to be displayed.

In step S6, the merchandise displayed is sequentially picked by the clerk of a supermarket. Then, after the bar code is scanned, the picked merchandise is packed in a bag corresponding to each client. When it is determined in step S7 that the packing operation terminates for a certain client, the delivery location and the receipt are attached to the bag.

It is determined in step S8 whether the bag-packing operation terminates for all the clients. If the operation does not terminate, the processes in and after step S5 are repeated. In the case that the sorted shopping list cannot be displayed one time on the display unit of the picking terminal 23, the display of the sorted shopping list should be continued, by scrolling the list.

When the bag-packing operation continues in a supermarket in arrangement order of shelves, the process in step S7 is performed whenever the bag-packing operation for a certain client terminates, and the bag-packing operation terminates for all the clients in step S8, the bag-packed merchandise is collectively delivered to the delivery location designated in step S9, and the process terminates.

Figure 6:
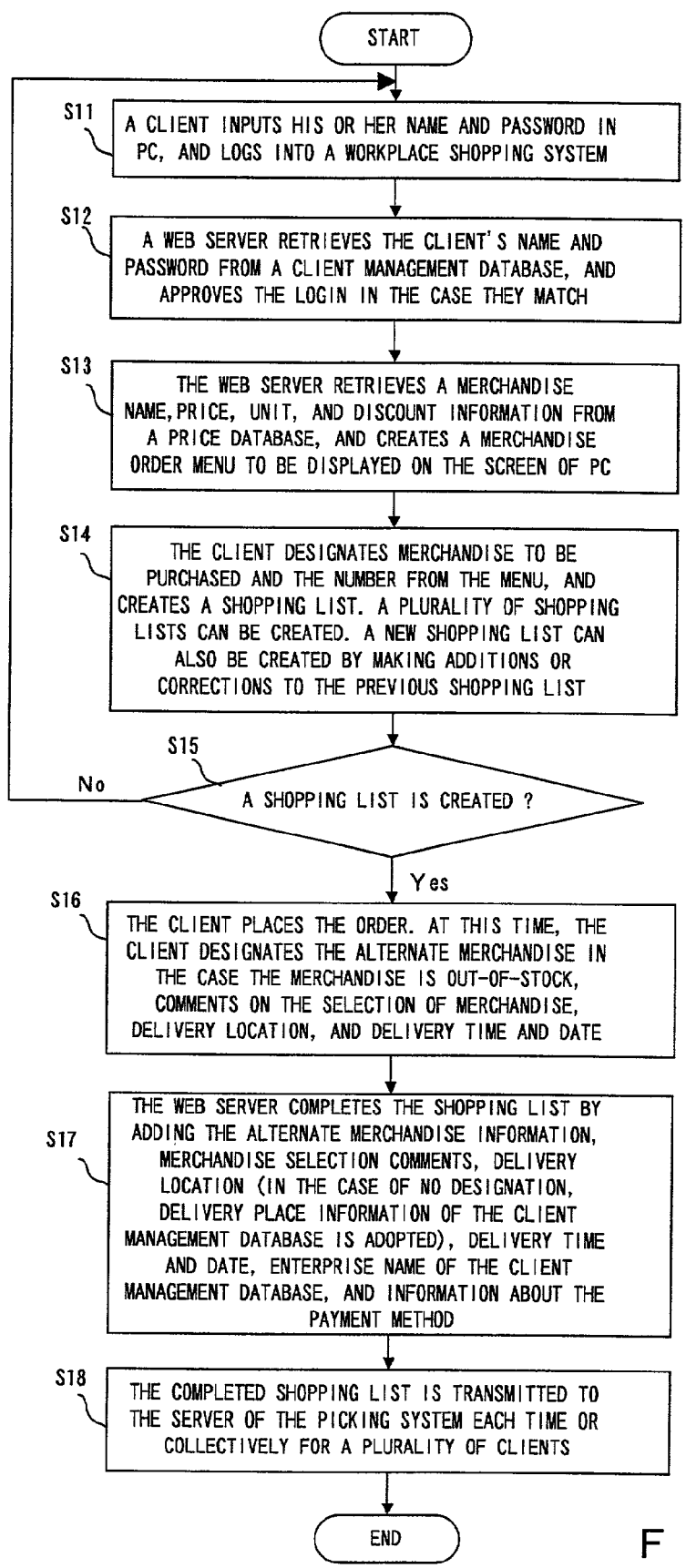
FIG. 6 shows a detailed flowchart of a workplace shopping order process of FIG. 5.

FIG. 6 shows a flowchart of the workplace shopping order process, in other words, the detailed processes in steps S1 to S3 of FIG. 5. When a process starts in the drawing, an employee, in other words, a client first inputs his or her name and password to the personal computer in step S11. The process of the login to the workplace shopping system is carried out. The web server 12 that receives the client's name and password via the Internet or an intranet in step S12, retrieves the client's name and password from a client management database of the client management system 17, for example. In the case that the input name and password are correct, the login of the client is approved.

Then in step S13, the web server 12 retrieves the name of the merchandise, price, unit, discount information from the price database, and for example, the database in the shop system 18, creates a merchandise order menu, and displays the menu on a screen of the personal computer 11 provided on the side of a client. The price of each piece of merchandise on the day is displayed in the merchandise order menu. The price may generally change every day.

There are two kinds of discount information. One is the discount information provided at a shop level that is uniformly applied to all purchasers. The other is the discount information provided at a private level that is applied for particular purchasers. As for the latter information, purchasers are specified by the identifier of a user at the time of login. The discount information to the special purchaser is obtained from the database of the client management system 17 on the basis of a one-to-one marketing technique to be displayed in the merchandise order menu.

As a menu of merchandise, characters are fundamentally used in consideration of the response of a client. The image information and explanation of the merchandise are displayed by clicking the image display button on a menu panel. This function is convenient in the case that the name of merchandise is not clearly remembered, or in the case that the differences between merchandise are not grasped. Therefore, this system is configured so as to be linked with a multimedia database that does not show drawings. For example, when "image display" is designated with the menu of an apple, the images of apples of a plurality of types and the explanation are displayed. When "image display" is designated with menu of fish, the images of fish of a plurality of types, the respective characteristics, and the explanation about the cooking are displayed.

In addition to the menu of general merchandise, the set menu or the recipe of cooking is displayed as a menu. For example, a set menu of Chinese style dinner for four persons, the merchandise menu of the ingredients to be purchased for sukiyaki, the cooking method, or the like are displayed. A client picks only a necessary piece of merchandise from the merchandise menu, and clicks "put into basket".

The client of the workplace 10 designates the merchandise to be purchased and the number of pieces of the merchandise from the merchandise order menu, using a personal computer 11, and creates the shopping list in step S14. A plurality of shopping lists can be created. Further, a new shopping list can be created by making additions or corrections to the shopping list that was created previously.

A plurality of shopping lists for placing an order on a weekend, for an order on a Wednesday, for an order for lunch, or the like can be created in advance. For example, the shopping list of all the merchandise that the client ordered in the past is also stored. It is possible to pick merchandise from the past shopping list to be put in a basket, in other words, it is possible to create a shopping list. In this case, the price of the merchandise that is updated on the day is displayed in the past shopping list. In addition to the above-mentioned shopping list, a list of the history of orders made in the past is also stored. In the history list, the price of the merchandise when the order was made in the past is displayed.

It is determined in step S15 whether a shopping list is created. In the case that the creation has not terminated yet, processes in and after step S11 are repeated. In the case that a client stops the creation of a shopping list in mid-course, and orders merchandise again, the process returns to step S11. In the case that a client requests the web server 12 for a new merchandise menu, the processes in and after step S13 are repeated.

In the case that a certain client stops the creation of a shopping list in mid-course as mentioned-above, the partially created shopping list is stored on a side of the web server 12. When the client restarts the creation of a shopping list later, he or she can continue the creation of a shopping list using the partially created shopping list that is stored on a side of the web server 12.

When it is determined that a shopping list is created in step S15, the order is placed by a client in step S16. In other words, the shopping list is sent to the web server 12 through the Internet or an intranet. At this time, designation of the alternate merchandise in the case merchandise is out-of-stock, comments on the selection of merchandise, designation of the delivery location and the delivery time, or the like, are made at the same time.

By making it possible that the delivery date and time are designated, a certain client makes a plurality of orders by designating each separate delivery time at the same time. That is, a plurality of shopping lists corresponding to various delivery times is created to be sent to the web server 12.

In the case merchandise is out-of-stock, it is designated whether the alternate merchandise is to be purchased. In the case of the purchase of the alternate merchandise, comments on the alternate merchandise, such as information about the brand, the designation of organic foods, or the like can be input. As for the general comments on the merchandise selection, such comments that, for example, a banana is very ripe, or a little blue banana is preferable, can be added.

For a delivery location, a client can also pick a delivery location among from a plurality of offices of the enterprise where the client works. It is convenient to receive the merchandise at the business destination during a business trip to another office. In order to do so, the order is sent to the picking system 13 such as a supermarket, shop, or warehouse that provides a service in the area including the designated delivery location.

The web server 12 completes a shopping list by adding information about the alternate merchandise, comments on the pickion of the merchandise, and the information about the delivery location, the delivery time and date, the enterprise name and the payment method stored in the client management database, to the shopping list that is received from the personal computer 11 in step S17. In the case that a delivery location is not specified by a client, the data of the delivery location that is registered in the client management database is used. Then, the shopping list that has been completed in step S18 is sent to the server 21 of the picking system 13 each time or the shopping list is gathered for several clients, and finally processes terminate.

Figure 7:
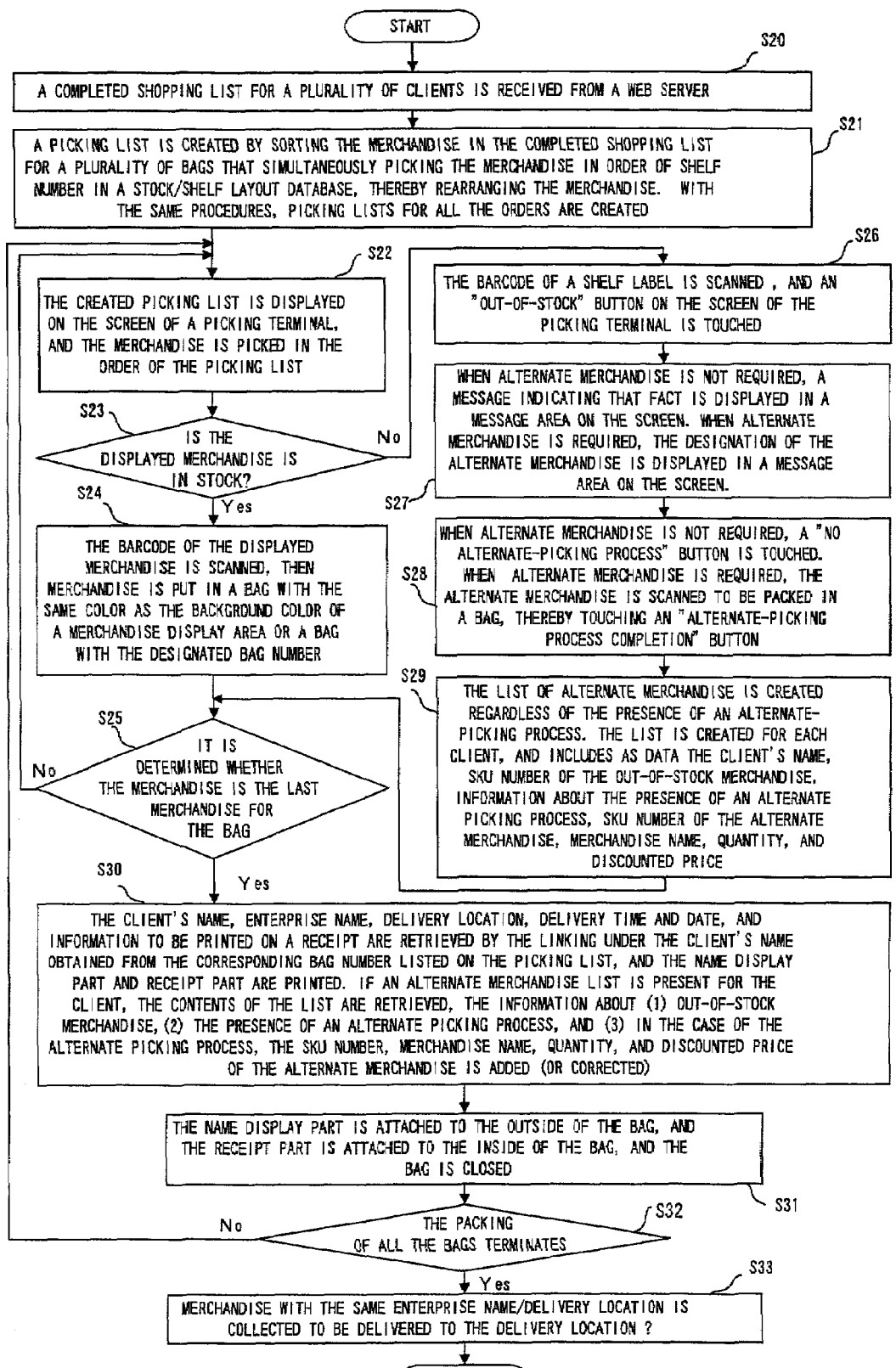
FIG. 7 is a detailed flowchart of a picking process of FIG. 5.

FIG. 7 is the detailed flowchart of steps S4 to S9 shown in FIG. 5, in other words, a detailed flowchart of a picking process. When a process starts in the drawing, completed shopping lists corresponding to a plurality of clients are received from the web server 12 in step S20. In step S21, the merchandise of the shopping list is sorted for the number of the bags to be used for simultaneously picking the merchandise for three or four clients. In other words, a picking list for sorting and rearranging the merchandise of the shopping list that is received from the web server 12 in arrangement order of shelves, and for packing in bags the ordered merchandise for three or four clients at the same time while a packing worker packs merchandise walking around the shop one time, is created. Picking lists for all the orders are made with the same procedure.

The picking list made in step S22 is displayed on the screen of the picking terminal 23 explained in FIG. 3. For example, the clerk of a supermarket picks merchandise on the basis of the sequence of the display of this picking list, and packs the merchandise in a bag for each client. It is determined in step S23 whether the merchandise displayed at this time is present. If the merchandise is present, the bar code of the displayed merchandise is scanned by a scanner 24 in step S24, and the merchandise is packed in the bag with the same color is as the background color of the merchandise display area on the display screen, or is packed in the bag with a designated bag number.

Here, when the merchandise is scanned by the clerk of a supermarket, the name, the number of the merchandise, the weight, the volume of the merchandise and the like are displayed with big characters in the upper part of the display screen of the picking terminal 23. Therefore, the clerk can confirm the contents. Furthermore, the background color of the display area changes as the bag number changes. The combination of the background color and the color of a bag or a box, or the combination of the background color and the color of the tape attached to the bag or the box prevents the clerk from making mistakes at the time of bag-packing. The background color changes in accordance with the bag number in such a way that the color of bag No. 1 is red, that of bag No. 2 is blue, that of bag No. 3 is yellow, that of bag No. 4 is green and so on. This change enables the clerk to pack in bags the merchandise ordered by four clients at the same time without error.

After the merchandise is packed in a bag in step S24, the picking list determines in step S25 whether the merchandise that is packed in the bag is the final merchandise, or, in other words, the final merchandise of the ordered merchandise of a certain client. It is displayed in the picking list whether the merchandise is the final merchandise, as described later. In the case that the merchandise is not the final merchandise, processes in and after step S22 are repeated. In the case that all the contents of the picking list are displayed on the screen of the picking terminal 23 at one time by the process in step S22, the picking process of the merchandise is proceeded by using the contents of the picking list. If this is not the case, the part that is not displayed is displayed by scrolling the list.

In the case that the merchandise displayed in step S23 is not on a shelf because of a reason such as the merchandise is out-of-stock or the like, the bar code of the label that is attached to the shelf is scanned in step S26. Then, a button of "out-of-stock" on the screen of the picking terminal 23 is touched. In the case that a touch panel is not used, "out-of-stock" is designated using a function key or the like. In response to the "out-of-stock" button being touched, information about the alternate merchandise designated when a client places an order in step S27, that is, the information about a message indicating that "the alternate merchandise is not required" in the case that the alternate merchandise is not required, or "a comment about the alternate merchandise" in the case that the alternate merchandise is required, is displayed in a message area on the screen which is described later.

Corresponding to this display, the clerk of a supermarket pushes a button of "no alternate-picking process" in the case that the alternate merchandise is not required. In the case that the alternate merchandise is required, the alternate merchandise is scanned, the picked merchandise is packed in a bag, and a button of "alternate-picking process completion" is pushed. Furthermore, instead of scanning the bar code of the label attached to a shelf in step S26, it is possible to touch the name of the merchandise on the display screen of the picking terminal 23, to designate the merchandise, and to touch a button "out-of-stock".

After the button "no alternate-picking process" or "alternate-picking process completion" is pushed in step S28, an alternate merchandise list is made in step S29, irrespective of the presence of the instruction in an alternate-picking process. The list is made for each client, and the name of a client, the number of the SKU (stock keeping unit) of the merchandise of out-of-stock merchandise, the information about whether the alternate merchandise is picked, the SKU number of the alternate merchandise, the name of the merchandise, the number of pieces of merchandise, and the discounted price are included in the list as data. Then, the flow advances to step S25.

If it is determined in step S25 that the merchandise is the final merchandise of the bag, the client name, enterprise name, delivery location, and information to be printed in the receipt are retrieved, and the name display part (client name and delivery location) and receipt part (items of the merchandise) are printed.

If the alternate merchandise list is presented to the client, (1) the out-of-stock merchandise, (2) the presence of the alternate-picking process, or (3) the information about the SKU number, the name, the number of pieces, and the discounted price of the alternate merchandise is added (corrected) to the receipt in the case that the instruction in alternate picking process is present. In the case that the alternate picking process is not carried out, the information and the price of the alternate merchandise are not included in the receipt. In step S31, the name display part (client name and delivery location) is attached to the outside of the bag, and the receipt part (items of merchandise) is put into the bag, and finally the bag is closed.

According to the scanning by the clerk who handles the final merchandise, notification of the end of bag-packing for a certain client is given to the clerk by automatically transmitting some signal, for example, sound transmitted from the server 21 of the picking system. The price of each piece of merchandise, the total amount, and the like are printed on the receipt (items of merchandise). As for the price, an amount of money can also be obtained by requesting a present price-look-up process by the picking terminal 23. In this case, the price-look-up (PLU) table is retrieved by the server 21 of the picking system 13, or the server of the shop system 18 on the basis of an SKU (stock keeping unit) code of the scanned bar code, so that the price of the merchandise can be obtained.

The reason why the price-look-up process is performed at the time of picking merchandise, is that the current price differs from that when the merchandise is ordered. There are several reasons such as (1) the order was made yesterday or before yesterday, (2) the price differs even on a time of a day, (3) the weight of the ordered merchandise cannot be the same as that of the merchandise to be sold by measure, (4) the price-look-up process is required for the alternate merchandise, or the like.

Figure 8:
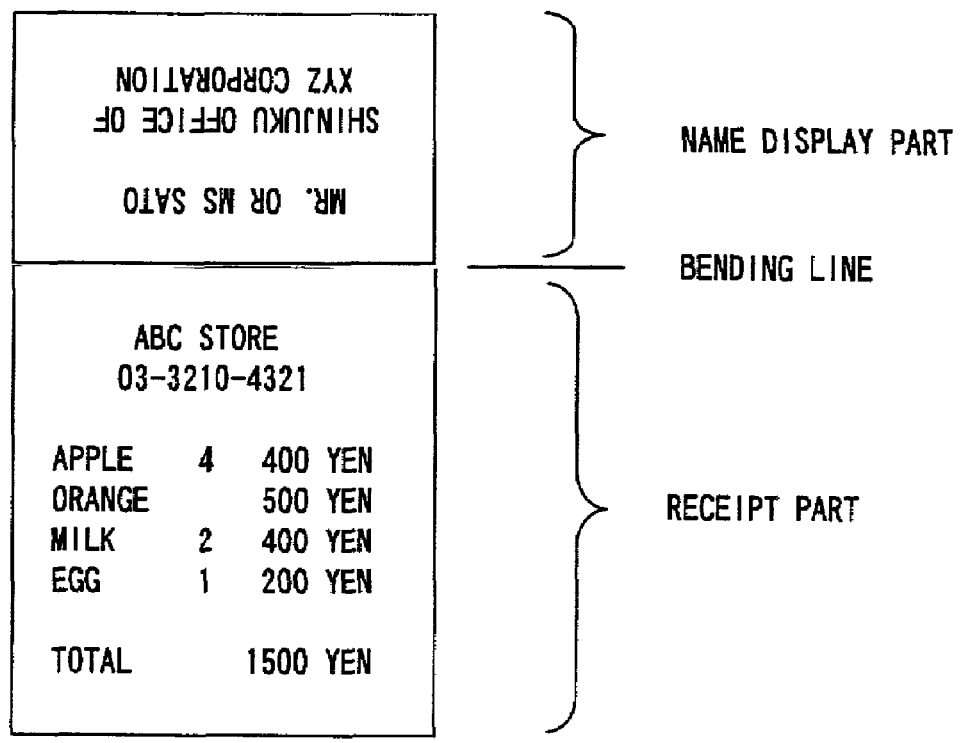
FIG. 8 is a drawing showing the printing example of a receipt.

A receipt is printed as shown in FIG. 8 in such a way that the delivery location being an address and name are printed in capital letters, and they are upside down to the items of the delivery merchandise by 180 degrees. Thus, the receipt is folded in the middle and is attached to the bag with a stapler. In the case that there are a plurality of bags or boxes of the purchase merchandise for one client, the number is input in the picking terminal 23, and a number indicating which bag out of the bags this bag is, is added to the receipt of each bag to be printed.

When the packing of one bag terminates, as shown in FIG. 7, it is determined in step S32 whether all the bags have been packed. If they have not, the processes in and after step S22 are repeated. If they have, a name display part, that is, the merchandise of the same enterprise name being an address, or the same delivery location are gathered in step S33, the merchandise is delivered, and the process terminates.

In the case that the bag-packing of merchandise for one client terminates in step S31, one method is to continue packing of the remaining bags remaining on the cart 22 at the time of the termination. In this case, all the packed bags are put down at the termination point when bags for three or four clients have been packed, and packing of bags for three or four employees restarts at the start point of the operation.

As a second method, when bag-packing terminates for a certain employee, the bag is immediately put down from the cart 22, a new bag is loaded on the cart 22, bag-packing of merchandise for a new client starts together with the remaining bags. At this time, the server 21 of the picking system 13 sorts the new client's ordered merchandise from the shelf where the last ordered merchandise of the client for whom bag-packing terminates is placed, in arrangement order of shelves. Then, the server 21 displays the sorted results on the screen of the picking terminal 23, so that picking of the merchandise for the orders of a plurality of employees is continuously performed.

Next, the contents of a database used in the flowcharts of FIGS. 5 to 7 are explained. FIG. 9 shows an example of a client management database provided with, for example, the client management system 17 of FIG. 2. FIG. 10 shows an example of a price database provided with the shop system 18. FIG. 11 shows an example of the data structure and storage data of a stock/shelf layout database that is provided with the picking system 13.

In the client management database of FIG. 9, the client's name is the name of a member registered in the workplace shopping system. The password is a specific password, for example, an identification number of the member, and is used at the time of making an order, in other words, at the time of ordering merchandise. The name of the enterprise is the title of enterprise, the party, or the like to which the member belongs. A delivery location is generally an office or the like where the member works, which is the delivery location of merchandise, and is the default location in the case that a specific location is not designated as mentioned-above at the time of making an order.

There are various methods of payment using a credit card number, house card number, or the like that is designated at the time of admission. It is possible to alternate the payment method later. At the time of alternation or change, an examination of qualification is carried out. The total number of points is the total number of points that are counted for each client corresponding to the purchase amount of merchandise, for example, the total number of points awarded by a frequent shopper's program (FSP). The sum of purchase amounts is the sum of purchase amounts of the client in the month. In the case that a ceiling amount is established for the sum of purchase amounts, the order of merchandise cannot be accepted when the sum exceeds the ceiling amount. This ceiling amount is stored, for example, in the column of client attribute information.

The client profile information is a storage area of the various pieces of information regarding a client. Here, data regarding the individual life style, eating habit, and other particulars of the client, or the data regarding the client's family and associates are recorded. There are various types of information such as sex, date of birth, address, phone number, E-mail address, hobbies, eating preferences (vegetarian, prefers health food, prefers organic food, dislikes genetically altered food, or the like), wine and other alcoholic beverage preferences, family status (in other words, Is there an infant in the family? Is there an aged person in the family? Is there a pet like a dog or a cat in the household?), names and birthdays of the members of the family and close friends, and the like.

FIG. 10 shows examples of the data structure of a price database and the data. In the drawing, the number of the SKU (the stock keeping unit) is a number of uniquely identifying merchandise. The number corresponds to the bar code attached to the merchandise. In other words, the number is the same as that indicated by the bar code, or it can be uniquely modified. The merchandise name is the name to uniquely specify merchandise. The name is generally composed of a brand name, a general name of merchandise, a specific name, information regarding size, such as the amount of milk, and the like. The price is displayed in merchandise units. The unit generally represents one piece of merchandise. Depending on the specific case, however, there is a case that as for fruit, one bag or one box may be represented as a unit. Further, there is another case that the weight of 100 g or the amount of one liter may be represented as a unit.

The discount information is the information that designates amount discount methods. Sometimes, the discount differs according to clients. In other words, there are various cases where the price is discounted for a specific client, the discount differs between a general client and a preferred client, the discount is given only for the client with a coupon, or the like. The discount amount is displayed such as " - - - % off", "- - - YEN off", "buy - - - pieces of merchandise, and get - - - YEN off", or "buy this merchandise and that merchandise, and get - - - YEN off", or the like. Further, there is still another case that the price is discounted only in the morning or only after 6 o'clock in the evening.

FIG. 11 shows examples of the data structure of a stock/shelf layout database, and the data. There is a case that the stock database and merchandise for each shelf database are stored by dividing the stock/shelf layout database into pieces. Further, there is another case that information is added to a price database to be combined as one database.

In FIG. 11, the SKU number and merchandise name are the same as those shown in FIG. 10. The bar code and merchandise name corresponding to the SKU number are displayed on the label attached to the shelf.

The stock amount is the amount of stock stored in a shop, warehouse, distribution center, or the like, and the unit is the same as that shown in FIG. 10. The shelf number is the information that shows the place of the shelf where the merchandise is placed in a shop, warehouse, distribution center, and the like. Here a continuation number is assigned to each shelf, so that the place can be uniquely specified by the number. In addition, a number can be expressed by combining the shelf number and the step number of the shelf, by combining the shelf number and the aisle number, by combining the shelf number and the address in the aisle, or the like.

The refrigeration-instruction column is an area for displaying "refrigeration-requirement" in the case that the ordered merchandise is a perishable food, frozen food, or the like that easily spoils. In addition, not only is "refrigerator-requirement" displayed but also is "chilled refrigeration" and "frozen refrigeration" to be more distinctive.

FIG. 12 is a completed shopping list, in other words, an example of a shopping list which information about alternate merchandise, for example, is added to by the web server 12 of FIG. 12, and before being passed to the picking system 13. In the drawing, Fuji apple is designated as the alternate merchandise for Delicious apple, and "red apple" is the comment on the merchandise.

FIG. 13 shows a sorted shopping list created by the server 21 of the picking system 13 of FIG. 3, that is, examples of the data structure and the data of the picking list. Here, it is assumed that the bag-packing of merchandise is simultaneously performed for four clients. Numbers 1 to 4 are used as the bag numbers.

In FIG. 13, the area of the final merchandise is the area showing that the merchandise is the last merchandise to be packed in the same bag. After the merchandise with the indication of "final" is packed in a bag, the mouth of the bag is closed by the clerk at the supermarket. After packing, the receipt showing the contents of the address information and purchase merchandise that are explained in FIG. 8 is printed, for example, by the picking terminal 23. The bag number and client's name at the bottom of the picking list are link information for linking a bag number with the shopping list of FIG. 12, in other words, the shopping list for each client. The shopping list is retrieved by this link, so that information to be printed, such as a client's name, enterprise name, delivery location, receipt information, and the like can be obtained by the retrieved contents.

FIG. 14 shows an example of the display screen of the picking terminal 23 of FIG. 3. In the drawing, the message area is a display area of the message that is sent, for example, from the server 21 of the picking system 13. This area is also used for an input area of weight that is described later. There are various messages such as an instruction message of "Termination of bag-packing. Close bag", an error message of "Error of scanned merchandise" in the case that the merchandise not ordered is scanned, an instruction message regarding the alternate-picking in the case merchandise is out-of-stock, or the like. The number of remaining pieces of merchandise is an area for displaying the number of remaining items of merchandise to be bag-packed.

In the case that there is no stock on a shelf, the "out-of-stock" button is touched among the five buttons provided under the message area, after the bar code of the label attached to the shelf is scanned or the merchandise name displayed in a scroll area is touched. By touching the button, a message indicating whether the alternate-picking is required, an instruction about the alternate merchandise, or comments from a client are displayed in the message area.

"Alternate-picking process completion" means that the process terminates by touching the button after the alternate merchandise is scanned to be packed in a bag. The process in the case of no alternate-picking terminates by touching the "no alternate-picking process" button when there is an instruction in a no alternate-picking process, or when suitable alternate merchandise cannot be found.

The "return" button is used for returning for some reason the packed merchandise to the shelf from the bag. For example, after the clerk of a supermarket notices an error, and touches the button, he or she picks merchandise scanned in the past from the scroll area, touches the merchandise name, and further scans the bar code of merchandise to be returned. Then, the merchandise can be returned in the case that the merchandise name matches the bar code. In other words, the item of the erased merchandise returns to the original display, so that the picking of the merchandise becomes possible once again. This process is unrelated to the contents of the picking list and receipt.

The "weight input" button is used for inputting the weight in the case that the merchandise is sold by measure. After the clerk touches the button, he or she inputs the weight using, for example, the ten-key pad or the soft key that appears in the scrollable area. In the case that the weight agrees with that designated by a client, input of the weight is not necessary.

In the scan information, the information about the merchandise currently scanned by the bar code is displayed. The contents are a shelf number, SKU number, merchandise name, quantity, bag number, and indication of refrigeration, from the left. The color of a bag or the color of a tape attached to the bag is used as the background color of a scan information area, and corresponds to the bag number. Since a bag number is 1 in the example of FIG. 14, the background color becomes red. A clerk packs merchandise in the bag of the same color so that he or she makes few errors at the time of the packing.

In the case that two or more pieces of merchandise are to be packed, the instruction indicating how many more pieces of merchandise should be packed is displayed. The indication of "refrigeration" is displayed when the merchandise should be packed in a bag being a refrigeration container or a box made of poly styrene, for example. Otherwise, refrigeration is indicated by a flashing refrigeration instruction, or a flashing scan information area. Further, the instruction is displayed being divided into "chilled refrigeration" or "frozen refrigeration".

The scrolling area is an area for displaying the results obtained by sorting all the merchandise in the picking list, in order of shelf number. In the case that the number of the pieces of merchandise is too great to be put in the display area, the merchandise is scrolled in order from the earliest picked merchandise. The merchandise that is already scanned and packed in a bag is checked off using a horizontal line. This scrolling area scrolls up and down by touching a scrolling button.

The above-explained workplace shopping has the possibility to be greatly developed in the future. Thereupon, this method is furthermore explained. In this workplace shopping, all the merchandise including the perishable foods sold, for example, at a supermarket can be ordered through the Internet, and the ordered merchandise can be received at the workplace. However, the question remains in who should share such cost to realize the method.

In the workplace shopping system, the cost of communication sent/received through an intranet and the Internet, and the delivery cost of merchandise, etc. are, for example, paid by the enterprise to which an employee receiving the service belongs. The enterprise pays the predetermined amount of money, for example, to the supermarket with the name of welfare of the employee. The supermarket pays a part of the received amount of money to the service provider which runs the service corresponding to the web server 12, etc., of FIG. 2 as a service charge, and allocates the remaining amount of money to the cost of delivery, marketing, or the like. Thus, it becomes possible that an employee receives service without sharing a service charge including the delivery charge of merchandise, etc., at all.

In the workplace shopping system, a client can order merchandise through a personal computer inside the enterprise, for example, through the Internet, and can receive the merchandise at the pick location inside the enterprise. For example, the delivery is carried out twice a day in such a way that the merchandise ordered by 10 o'clock is delivered at 12:30, the merchandise ordered by 2 o'clock is delivered 5 o'clock. The merchandise that can be ordered includes all the merchandise sold, for example, in a supermarket. The price and discount of the merchandise are the same as those of the merchandise purchased when the client goes to the supermarket. The chilled food is packed in a box of the poly styrene. The frozen food is packed in a box of the poly styrene containing a cooling agent, to be delivered by a track with a refrigeration function. For example, the foods are cooled for 3 hours. The amount of money of merchandise that is ordered one time might become over a minimum amount, at which amount a delivery charge is not required.

To make an order on the order screen using a personal computer and the like inside the enterprise, the above-mentioned special sale information is displayed, and the information about merchandise that a certain client purchases repeatedly is also registered. Regarding the merchandise information, a list is displayed for each category, and the keyword of merchandise can be retrieved. As mentioned above, the alternate merchandise at the time merchandise is out-of-stock, and various comments on merchandise can be input.

This workplace shopping system enables a supermarket to cultivate a new client or loyal an established client. This system works as long as the ordered merchandise can be delivered, even if no shop is nearby. Furthermore, the picking system is provided with a warehouse or distribution center in addition to a shop. As for the merit to the enterprise and employees, practical and convenient welfare for the enterprise and employees can be realized with low cost. As for the merit to the provider, a stable service charge can be securely gained.

Figure 15:
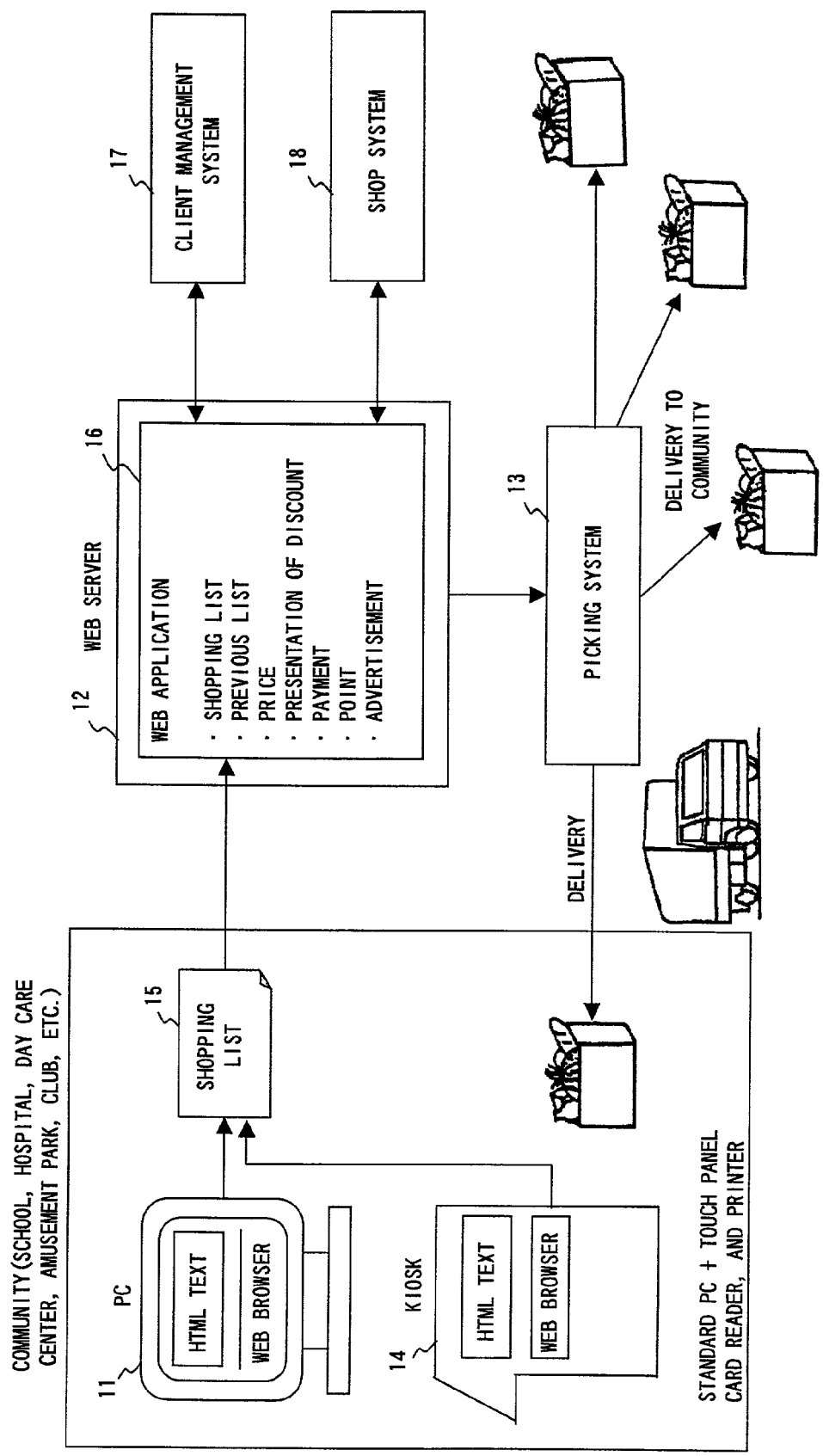
FIG. 15 is a block diagram showing the configuration of a community shopping system.

In the above-mentioned explanation, the workplace shopping system is such that an employee of the enterprise orders merchandise at the workplace and receives the merchandise at the workplace. Naturally, this method can be used as a shopping system for each group/organization within each community such as a school, hospital, day-care center, amusement park, club, etc. FIG. 15 is an explanatory drawing of such community shopping. A client who belongs to the community, being one party, orders merchandise from the community, and receives the merchandise delivered there. As for the configuration, the workplace of FIG. 2 only requires the address of the community. The others components of the configuration are entirely the same as those of FIG. 2.

Figure 16:
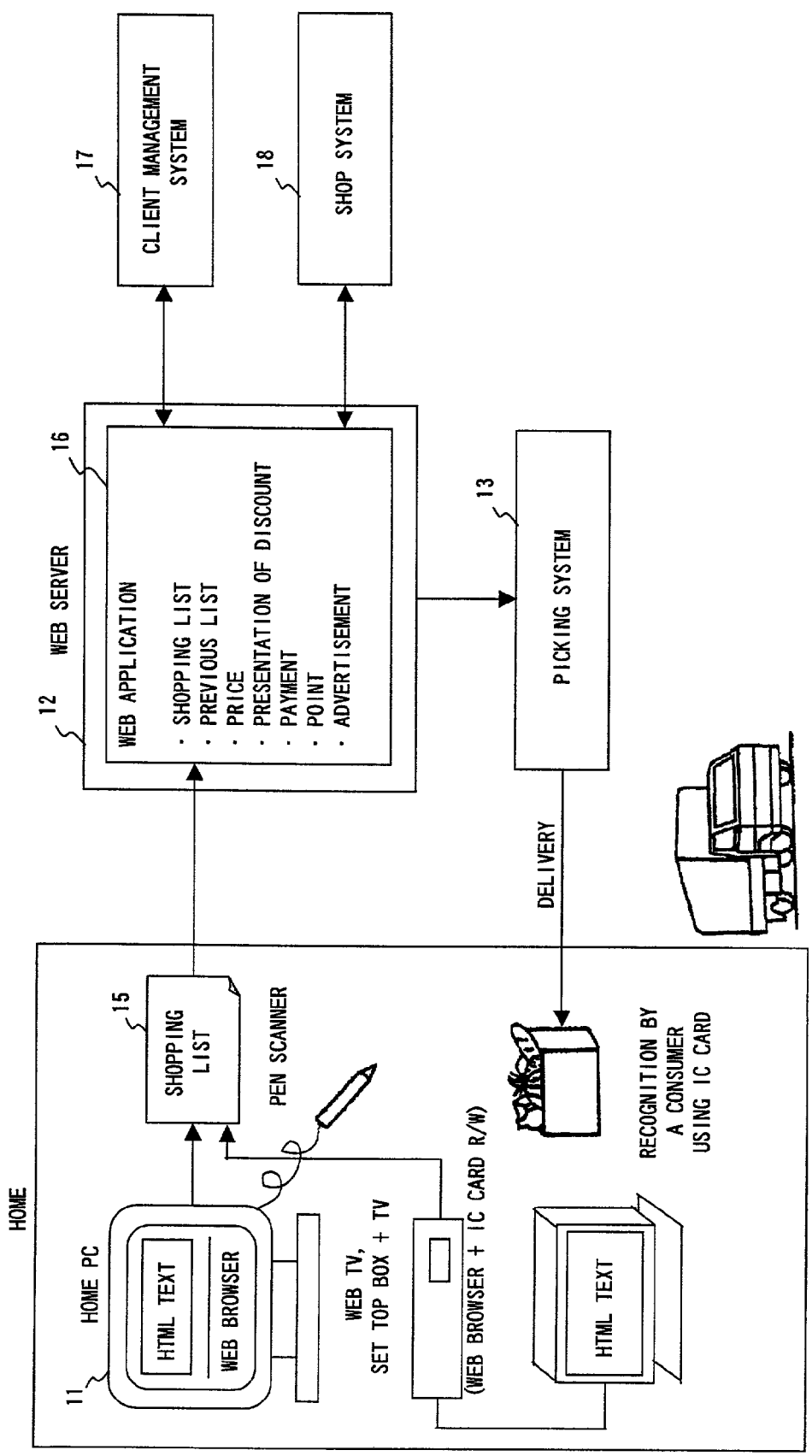
FIG. 16 is a block diagram showing a configuration example of a home shopping system.

Furthermore, a method of workplace shopping can be naturally applied to home shopping. FIG. 16 shows the configuration of such a home shopping system. The configuration of the drawing is the same as that of the workplace shopping of FIG. 2. In a home, however, merchandise can be ordered more easily by using a pen scanner to input data to a personal computer or a web television that can connect with the Internet, instead of a personal computer.

A shopping system obtained by combining workplace shopping, community shopping, and home shopping can be naturally realized. For example, a client orders merchandise from his or her home, and he or she can receive the ordered merchandise at the workplace or party location (community) to which he or she belongs. For example, it is also possible that a dependent of the employee of a certain workplace orders merchandise from his or her home, the employee picks up the merchandise delivered to the workplace of the employee, and takes it back to the home.

The place for receiving the merchandise is not limited to the address of the home, workplace, or party. The place can be, for example, a shop that sells the merchandise. In this case, a client can receive the packed merchandise at the front of the shop that receives the order from the client or at the service counter inside the shop.

Finally, the loading of a program that realizes the present invention, into a computer is explained. In the workplace shopping system of FIG. 2, for example, any of the personal computers 11 of an employee, the web server 12, and the server of the picking system 13, in other words, the server 21 of FIG. 3 can be realized as a general computer system.

Figure 17:
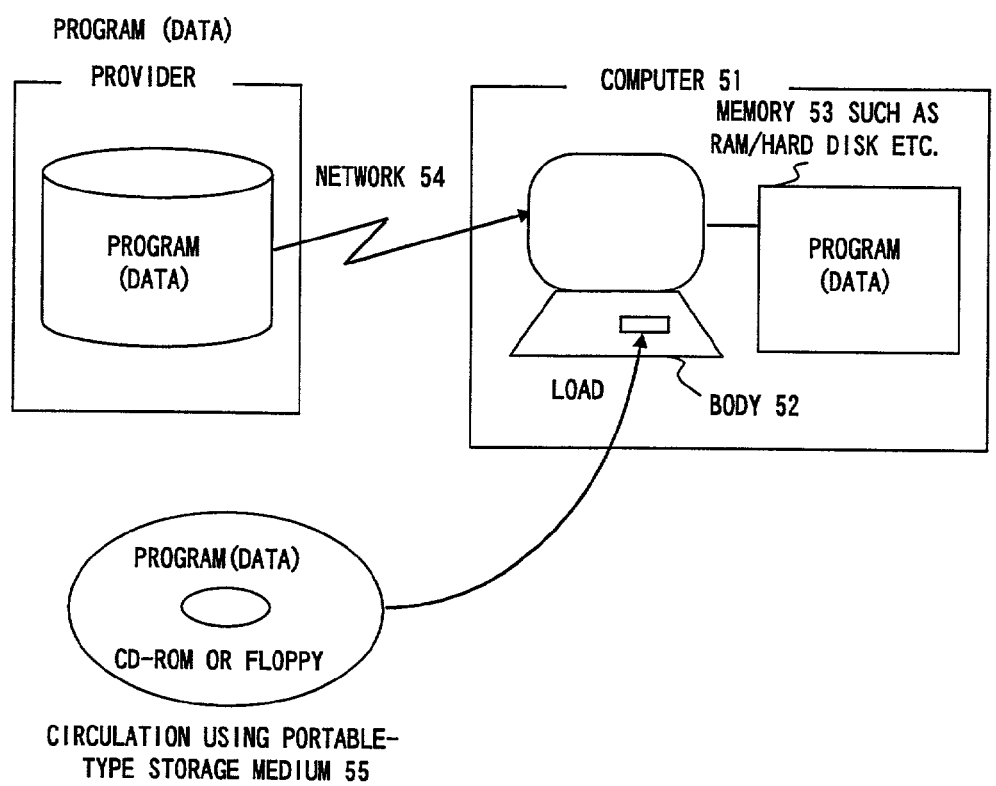
FIG. 17 is a diagram showing the loading process of a program and data to a computer.

FIG. 17 is an explanatory drawing of the loading of the program that is used in such a computer system. In the drawing, a computer 51 is configured by a body 52 and a memory 53 for storing a program. As for the memory 53, various types of memories such as a read only memory (ROM), a random access memory (RAM), or a hard disk can be used. A program is executed by the computer 51 by transmitting the program through a network 54 from a program provider, and by loading the program into the computer 51. In another method, a program is executed by the computer 51 by loading a portable-type storage medium 55 that has been put on the market and circulates in the market, to the body 52.

As the portable-type storage medium 55, various types of storage media such as a floppy disk, CD-ROM, MO, an optomagnetic disk can be used. Programs or the like corresponding to claims 30 to 32 of the present invention, or a part of the flowcharts of FIGS. 5 to 7 that is executed by a computer is recorded in the portable-type storage medium 55, thereby loading the medium 55 to the computer 51. Thus, a process for realizing the workplace shopping of the present invention becomes possible.

As described above, the present invention can offer a shopping system where the employee of the enterprise, for example, can order every daily necessities, including perishable foods, while being at the workplace, and can receive the ordered merchandise at the workplace, which is easy to use and convenient for the employee. At the same time, this system has a big merit in that an established client can be loyal for a supermarket. Therefore, the development in the business field is greatly expected.

While the invention has been described with reference to the preferred embodiments thereof, various modifications and changes may be made by those skilled in the art without departing from the true spirit and scope of the invention as defined by the claims thereof.

What is claimed is:

1. A shopping system for ordering and delivering merchandise, said system comprising:
   a first order reception unit receiving a first order for merchandise from a first client;
   a second order reception unit receiving a second order for merchandise from a second client;
   a shopping list creation unit creating a first shopping list and second shopping list based on the first order and the second order;
   a merchandise packing instruction unit receiving the first shopping list and the second shopping list from the shopping list creation unit, and generating a first set of instructions to pick and pack the merchandise; and
   a merchandise delivery means for delivering the merchandise to a first location and a second location corresponding to the first client and the second client; wherein
   the first order reception unit or the second order reception unit is provided in a workplace, and the first location or the second location is an address of the workplace, wherein
   the merchandise packing instruction unit sorts the merchandise listed in the first shopping list and the second shopping list into an order to facilitate packing, creates a first picking list, and generates the first set of instructions for picking and for packing the merchandise in accordance with the first picking list, and wherein
   the merchandise packing instruction unit creates a second picking list, and generates a second set of instructions to pick and pack the merchandise based on the second picking list when the picking and packing of the merchandise of the first client or the second client is completed.

2. The shopping system according to claim 1 wherein the first order reception unit or the second order reception unit presents a merchandise menu displaying a price for each merchandise.

3. The shopping system according to claim 2 wherein the first order reception unit or the second order reception unit adds and displays image information of merchandise in accordance with a request for the merchandise menu.

4. The shopping system according to claim 1 wherein the first order reception unit or the second order reception unit presents a list of past prices of merchandise in a past shopping list created by the shopping list creation unit, and a list of current price.

5. The shopping system according to claim 1 wherein the first order reception unit or the second order reception unit presents a past merchandise history list with the corresponding past price of merchandise.

6. The shopping system according to 1 wherein the first order reception unit or the second order reception unit receives data indicating an office designated by the client from among a plurality of offices of an enterprise being the workplaces as a delivery location of merchandise at a same time of ordering merchandise, and a delivery location of the merchandise is the designated office.

7. The shopping system according to claim 1 wherein the merchandise packing instruction unit further comprises a display unit displaying the first picking list or the second picking list.

8. The shopping system according to claim 7 wherein the display unit displays the merchandise in the first picking list or the second picking list by using a background color corresponding to the client who ordered the merchandise.

9. The shopping system according to claim 8 wherein the display unit flashes the background color or indicates refrigeration requirements for the merchandise that require refrigeration.

10. The shopping system according to claim 7 wherein the merchandise packing instruction unit further comprises a out-of-stock information reception unit receiving out-of-stock information when the merchandise is out-of-stock.

11. The shopping system according to claim 10 wherein the out-of-stock information reception unit is configured by a touch button for touching an area on a display screen of the display unit at which a merchandise name in an item in the first picking list or the second picking list is displayed, and an "out-of-stock" button of an area other than the area displaying an item in the picking list on the display screen.

12. The shopping system according to claim 1 wherein the merchandise packing instruction unit further compromises:
a packing end notice unit for notifying an end of packing corresponding to a first order or a second order; and
a receipt printing unit for printing a receipt with the first client's or the second client's name and with a list of merchandise packed.

13. The shopping system according to claim 12 wherein the receipt printing unit further comprises a price check unit for checking a price of merchandise at the end of packing, and the receipt printing unit prints the checked price on items of packing merchandise.

14. The shopping system according to claim 12 wherein the receipt printing unit prints a receipt in such a way that the first client's name or the second client's name is upside down to items of merchandise by 180 degrees in order to make the receipt bendable so that the first client's name or the second client's name is attached on an outside of a pack and items of the merchandise is attached on an inside of the pack.

15. The shopping system according to claim 12 wherein the receipt printing unit further prints a predetermined number on a side of the first client's name or the second client's name when a plurality of packaged is created.

16. The shopping system according to claim 1 wherein the first order reception unit or the second order reception unit is located at a school, hospital or a day-care center, and the first location or the second location of the merchandise is an address of the school, hospital or the day-care center.

17. The shopping system according to claim 1 wherein the first order reception unit or the second order reception unit is located at a home of the first client or the second client, and the first location or the second location of the merchandise is the address of the home.

18. The shopping system according to claim 1 wherein the first order reception unit or the second order reception unit is located at a home of the first client or the second client, and a delivery the first location or the second location of the merchandise is the address of the workplace, or the address of a school, hospital or a day-care center to which the first client or the second client belongs.

19. The shopping system according to claim 1 wherein the first order or the second order includes merchandise having different times and dates of delivery, and
wherein the shopping list creation unit creates a plurality of shopping lists corresponding to the different times and dates of delivery.

20. The shopping system according to claim 1 wherein the shopping list creation unit creates a plurality of shopping lists corresponding to the first client or the second client.

21. The shopping system according to claim 1 wherein the shopping list creation unit further comprises a mid-course creation shopping list storage unit storing a shopping list which is being created in mid-course for the first client or the second client when an order operation instructed by a client is stopped in mid-course, and when the order operation instructed by the first client or the second client restarts, the shopping list creation until continues creation of a shopping list using the mid-course-creation shopping list stored in the shopping list storage unit.

22. A shopping system for ordering merchandise and receiving it at a shop, the system comprising:
a first order reception unit receiving a first order of merchandise from a first client;
a second order reception unit receiving a second order of merchandise from a second client;
a shopping list creation unit creating one or more shopping lists corresponding to the first order or the second order;
a merchandise packing instruction unit receiving the one or more shopping lists from the shopping list creation unit, and generating a first set of instructions to pick and pack the merchandise; and
an ordered merchandise storage unit storing the packed merchandise in a shop where the first client or the second client visits to receive the ordered merchandise, wherein
the first order reception unit or the second order reception unit is provided in a workplace, and the first location or the second location is an address of the workplace, wherein
the merchandise packing instruction unit sorts the merchandise listed in the one or more shopping lists into an order to facilitate packing, creates a first picking list, and generates the first set of instructions for picking and for packing the merchandise in accordance with the first picking list, and wherein
the merchandise packing instruction unit creates a second picking list, and generates a second set of instructions to pick and pack the merchandise based on the second picking list when the picking and packing of the merchandise of the first client or the second client is completed.

23. The shopping system according to claim 22 wherein the first order reception unit or the second order reception unit is located at an address of the first client's home or the second client's home, workplace or a school, hospital or day-care center which the first or second client belongs.

24. A merchandise picking system for picking ordered merchandise to be delivered to a client, said system comprising:
a merchandise packing instruction unit receiving one or more shopping lists from a plurality of clients, and generating a first set of instructions for picking and packing of ordered merchandise for the plurality of clients; and
a merchandise deliver means for delivering the packed merchandise to distribution locations corresponding to the plurality of clients;
an order reception unit provided in a workplace, wherein a delivery location is an address of the workplace, wherein
the merchandise packing instruction unit sorts merchandise listed in the one or more shopping lists in an order to facilitate packing, creates a first picking list, and generates the first set of instructions for picking and for packing of the ordered merchandise in accordance with the first picking list, and wherein
the merchandise packing instruction unit creates a second picking list, and generates a second set of instructions to pick and pack the ordered merchandise based on the second picking list when the picking and packing of the ordered merchandise of one of the plurality of clients is completed.

25. A shopping method in which a client orders merchandise and the merchandise is delivered to the client, comprising the steps of:
receiving an order of merchandise from at least one of a plurality of clients located in a workplace;

creating one or more shopping lists, each shopping list corresponding to an order from one of the plurality of clients;

receiving the one or more shopping lists, and creating instructions for picking and packing of ordered merchandise for the plurality of clients;

delivering the merchandise to locations respectively corresponding to the plurality of clients; wherein the step of receiving the one or more shopping lists includes:

sorting the ordered merchandise listed in the one or more shopping lists in an order to facilitate packing;

creating a first picking list;

generating a first set of instructions for picking and for packing of the ordered merchandise in accordance with the first picking list;

creating a second picking list; and generating a second set of instructions to pick and pack the ordered merchandise based on the second picking list when the picking and packing of the ordered merchandise of one of the plurality of clients is completed.

26. A merchandise picking method for picking ordered merchandise to be delivered to a client, comprising the steps of:

receiving a plurality of shopping lists of ordered merchandise from a plurality of clients in a workplace;

generating a first set of instructions for picking and packing of ordered merchandise for the plurality of clients; and delivering the ordered merchandise to locations respectively corresponding to the plurality of clients; wherein the step of generating instructions for picking and packing of ordered merchandise includes:

sorting merchandise listed in the plurality of shopping lists;

creating a first picking list;

generating the first set of instructions for picking and for packing of the ordered merchandise in accordance with the first picking list;

creating a second picking list; and generating a second set of instructions to pick and pack the ordered merchandise based on the second picking list when the picking and packing of the ordered merchandise of one of the plurality of clients is completed.

27. A computer-readable storage medium on which is recorded a program for a computer to execute a merchandise ordering process, said process comprising the steps of:

presenting a menu of merchandise to a plurality of client;

receiving an order of the merchandise from the plurality of the clients;

generating a first set of instructions for picking and packing of ordered merchandise from the plurality of clients;

sorting merchandise listed in the first set of instructions;

creating a first picking list; and generating the first set of instructions for picking and for packing of the merchandise in accordance with the first picking list;

creating a second picking list;

generating a second set of instructions to pick and pack the ordered merchandise based on the second picking list when the picking and packing of the ordered merchandise of one of the plurality of clients is completed.

28. A computer-readable storage medium on which is recorded a program for a computer to execute a shopping list creating process, said process comprising the steps of:

creating a menu of merchandise;

transferring the menu to a first computer at a client location provided in a workplace;

creating one or more shopping lists from a merchandise order sent from the computer at the client location corresponding to the menu;

transferring the one or more shopping lists to a second computer located at a merchandise delivery location;

sorting the merchandise listed in the one or more shopping lists, each shopping list corresponding to one of a plurality of clients, in an order to facilitate packing;

creating a first picking list;

generating a first set of instructions for picking and for packing of the merchandise in accordance with the first picking list;

creating a second picking list; and generating a second set of instructions to pick and pack the ordered merchandise based on the second picking list when the picking and packing of the ordered merchandise of one of the plurality of clients is completed.

29. A computer-readable storage medium on which is recorded a program for a computer to execute a instructing process when picking and packing ordered merchandise, said process comprising the steps of:

sorting all merchandise listed in a plurality of shopping lists as lists of ordered merchandise in an order to facilitate packing;

creating a first picking list;

generating a first set of instructions to pack the ordered merchandise based on the first picking list;

creating a second picking list; and generating a second set of instructions to pick and pack the ordered merchandise based on the second picking list when the picking and packing of the ordered merchandise of one of the plurality of clients is completed.

* * * * *